(12) United States Patent
Hirata et al.

(10) Patent No.: US 6,338,239 B1
(45) Date of Patent: Jan. 15, 2002

(54) TURBINE SYSTEM HAVING A REFORMER AND METHOD THEREOF

(75) Inventors: Haruhiko Hirata; Yukio Ohashi, both of Kanagawa-ken; Masafumi Fukuda, Saitama-ken; Koichi Kawamoto, Kanagawa-ken, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/388,375

(22) Filed: Sep. 1, 1999

(30) Foreign Application Priority Data

Sep. 4, 1998 (JP) .............................. 10-251475

(51) Int. Cl.$^7$ .............................. F02G 3/00; F02B 43/00
(52) U.S. Cl. .................... 60/39.02; 60/39.05; 60/39.12; 60/39.55
(58) Field of Search ............................ 60/39.02, 39.05, 60/39.12, 39.55, 730

(56) References Cited

U.S. PATENT DOCUMENTS

| 5,431,007 A | 7/1995 | Viscovich et al. | ......... 60/39.05 |
|---|---|---|---|
| 5,595,059 A * | 1/1997 | Huber et al. | ................ 60/39.02 |
| 5,873,236 A * | 2/1999 | Koyama et al. | ........... 60/39.12 |
| 5,896,738 A * | 4/1999 | Yang et al. | ................. 60/39.05 |

FOREIGN PATENT DOCUMENTS

| JP | 2-286835 | 11/1990 |
|---|---|---|
| JP | 5-332167 | 12/1993 |
| JP | 7-269371 | 10/1995 |
| JP | 2575888 | 11/1996 |

* cited by examiner

Primary Examiner—Charles G. Freay (57) ABSTRACT

A turbine system and method for power generation has an electric generator, a reformer, a cooler, a fuel compressor, an air compressor, a combustor, a turbine, an evaporator. The reformer reforms fuel containing a mixture of hydrocarbon gas and steam to produce hydrogen and carbon dioxide. To enhance reformation, the reformation is carried out under pressure at 7 ata or less. To aid compression, the cooler cools the reformed fuel before the compressor compresses the reformed fuel. The combustor burns air compressed by the air compressor, which is driven by the turbine, and the reformed fuel received from the fuel compressor to generate hot gas. The turbine receives the hot gas from the combustor and drives the generator to generate electricity. The reformer receives the hot gas discharged from the turbine as a heat source to heat the fuel and chemically reform the fuel.

25 Claims, 9 Drawing Sheets

TURBINE SYSTEM HAVING A REFORMER AND METHOD THEREOF

BACKGROUND

A turbine system is typically used to drive a generator, which in turn generate electricity. A turbine typically burns fuel, such as methane, mixed with compressed fluid containing oxidant, e.g., air, resulting in hot combustion gas. The combustion gas impinges on rotor blades and rotates the rotor associated with the blades. The rotary power is transferred to a generator. In such the turbine system, the thermal efficiency can be increased by raising the combustion gas temperature.

Generally, the blades, which can include stator and rotor blades, are made of metal. If metal blades are used, the combustion-gas temperature cannot be too high since high temperatures weaken or melt metal. Thus, the metal blades need to be cooled if the combustion-gas temperature is high, or be exposed to lower (less efficient) combustion-gas temperatures. Some known methods of cooling metal blades include circulating coolant through the blade and blowing coolant from the blade inside to the blade surface. In the latter method, a film of low-temperature coolant is formed on the blade surface to reduce the heat propagating from the combustion gas to the blade.

In spite of these cooling methods, however, there is a limit as to how high the combustion-gas temperature can be. Furthermore, it is difficult to increase efficiency with the above methods, particularly the blowing method of blowing coolant to the blade surface, because the coolant will lower the combustion-gas temperature according to a flow ratio of the coolant.

To enhance efficiency, attempts have been made to recover thermal energy from the hot gas discharged from the turbine system. For example, the hot gas discharged from the turbine is directed to a heat recovery steam boiler, which generates steam under high temperature and high pressure. Steam is supplied to a steam turbine, which in turn generates additional power. Because the heat that would be lost otherwise is recovered, improving the efficiency of the overall system.

In another proposal aimed at improving efficiency, the recovered heat from the exhaust gas heats the fuel supplied to the turbine to improve the chemical energy of the fuel (via reforming process). The major component of natural gas, which is one of the most common fuel, is typically methane. Methane can be reformed chemically by mixing it with steam in a high temperature environment (about 800° C.). Methane can be converted into hydrogen and carbon monoxide by maintaining high temperature under an existence of a catalyst, such as nickel.

A turbine system that reforms fuel by using the turbine exhaust gas with methane as a major fuel source is disclosed, for example, in Japanese patent (Koukai) No. 2-286835 and Japanese patent (Koukai) No. 7-269371 (or its U.S. counterpart, U.S. Pat. No. 5,431,007). These Japanese patents disclose about needing to increase the temperature of the turbine exhaust gas, which is typically about 550° C., to efficiently reform the fuel. The latter reference discloses heating the exhaust gas temperature to preferably 650° C. from its exhaust temperature of about 550° C. at the pressure of 7–13.8 ata (0.7–1.38 MPa). The former reference discloses raising the fuel temperature during reformation by burning fuel in an auxiliary combustor and supplying heat to the reformer. The latter reference also discloses an alternative way of raising the fuel temperature during reformation, by circulating steam through the turbine blade. Steam absorbs heat from the turbine blade and cools the same. The steam circulated through the turbine blade, and thus having a higher temperature due to heat absorption from the turbine blade, is then used to heat the fuel in the reformer.

Even with these methods, it is difficult to improve efficiency of the turbine system because the auxiliary combustion consumes fuels in addition to the fuel supplied to the combustor of the turbine. Moreover, the turbine blade is typically heat-resistant to about 800° C. Coolant, such as cooling steam running through the turbine blade is below 800° C. Therefore, it is difficult to obtain the desired reforming temperature of about 800° C. by supplying cooling steam that ran through the turbine blade to the reformer, for example, under pressure of 7–13.8 ata. Thus, it is difficult to improve the fuel reforming ratio.

SUMMARY OF THE INVENTION

The present invention relates to a turbine system for producing power and a method thereof. The turbine system includes a reformer, an oxidant compressor, a fuel compressor, a combustor, and a turbine. The reformer reforms fuel containing a mixture of hydrocarbon gas and steam to produce hydrogen and carbon dioxide. The fuel compressor compresses the fuel reformed by the reformer and the oxidant compressor compresses oxidant. The combustor burns the compressed oxidant and the reformed fuel to generate hot gas. The turbine receives the hot gas from the combustor to generate power. The reformer receives the hot gas discharged from the turbine as a heat source to heat the fuel and chemically reform the fuel.

The method of producing power includes reforming a fuel containing a mixture of hydrocarbon gas and steam in a reformer by heating with a heat source to produce hydrogen and carbon dioxide; compressing the reformed fuel and oxidant; generating hot gas by combusting the compressed reformed fuel and oxidant in a combustor; discharging the hot gas to a turbine; and generating power with the turbine. The heat source is the exhaust gas discharged from the turbine.

According to one aspect of the invention, the reformer reforms the fuel under pressure less than or equal to 7 ata.

The turbine system can include a cooler or condenser or both. The cooler cools the reformed fuel with a coolant before the reformed fuel is compressed with the fuel compressor. The condenser extracts water contained in the cooled reformed fuel before compressing the cooled reformed fuel with the fuel compressor.

The coolant can be water or liquid that evaporates. In the case of water, the reformed fuel heats water and generates steam. Heat exchange between water and the reformed fuel cools the reformed fuel. The steam can be introduced directly into the combustor or mixed with the reformed fuel. The reformed fuel mixed with the steam can be compressed with the fuel compressor before it is introduced into the combustor. In the case of evaporative liquid, heat exchange between the reformed fuel and the cooling liquid evaporates the liquid. The evaporated liquid can be introduced directly into the combustor.

According to another aspect of the invention, the amount of power generation can be regulated with a power generation regulator, such as a valve. This can be achieved by regulating the amount of steam to be mixed with the hydrocarbon containing gas.

The turbine system can further include means for raising the reforming temperature. The reforming temperature raising means can comprise an additional combustor that combusts the hot gas discharged from the turbine and additional fuel to raise the temperature of the hot gas introduced to the reformer. The reforming temperature raising means can also comprise oxidant mixed with the pre-reformed fuel. The oxidant causes the pre-reformed fuel to partly combust when the hot gas discharged from the turbine heats the pre-reformed fuel in the reformer, thus raising the reforming temperature. The oxidant can be obtained from the hot gas, such as the hot gas discharged from the turbine, reformer, or evaporator.

BRIEF DESCRIPTION OF THE DRAWINGS

These and other features, aspects, and advantages of the present invention will become more apparent from the following description, appended claims, and accompanying exemplary embodiments shown in the drawings, which are briefly described below.

DETAILED DESCRIPTION OF THE PREFERRED EMBODIMENTS

Seven exemplary embodiments of a turbine system, as shown in FIGS. 1 and 3–8, serve to illustrate the present invention. Same or corresponding elements are labeled with the same reference numerals.

Figure 1:
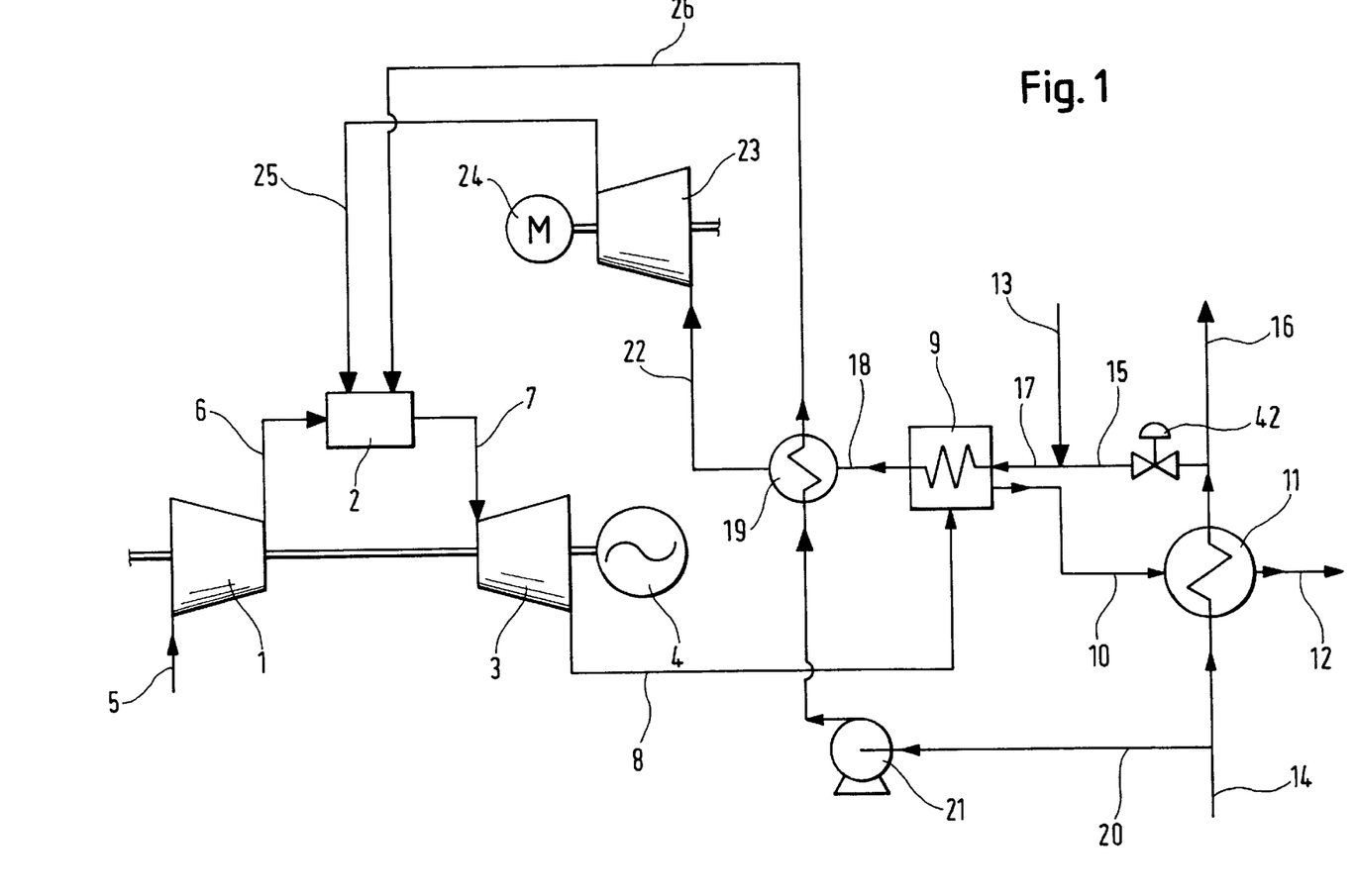
FIG. 1 shows a schematic diagram of a turbine system of the first embodiment according to the present invention.

FIG. 1 shows a schematic diagram of a turbine system of the embodiment according to of the present invention. The turbine system includes a compressor 1 that compresses oxidant, e.g., air 5, (compressed air 6), a combustor 2 that burns compressed or pressurized reformed fuel 25 and the compressed air 6, a turbine 3, and a generator 4 connected to the turbine 3. The turbine 3 generates power by using hot gas, which is a high-pressure, high-temperature combustion gas 7, produced in the combustor 2. The turbine 3, which is also used for driving the compressor 1, drives the generator 4 and generates electric power. The high-temperature, high-pressure combustion gas 7 discharged from the turbine 3, after powering the turbine, looses temperature and pressure.

The fuel 25 supplied to the combustor 2 comprises reformed fuel 18 containing hydrogen, which is obtained by reforming fuel 17 typically consisting essentially of steam 15 and methane 13. Steam 15 is generated at an evaporator 11. The fuel 17 is further heated to obtain the reformed fuel 18 in the reformer 9 using the hot gas 8 discharged from the turbine 3. The reformed fuel 18 is cooled through a cooler 19 and compressed using a compressor 23, which is driven by a separate motor 24. The turbine 3, however, can drive the compressor 23. The cooled and compressed reformed fuel 25 is supplied to the combustor 2. The exhaust gas 10 circulated through the reformer 9 is supplied to the evaporator 11 and discharged as an exhaust gas 12. The evaporator 11 uses heat from the exhaust gas 10 to heat water and generate steam 16. The generated steam 16 can be used for other utilities (for example, for heating rooms, or a heat source for facilities). Part of the generated steam 16 is supplied to the reformer 9 as steam 15.

The cooler 19 cools the reformed fuel 18 using coolant, such as water 20, circulated using a pump 21, and generates steam 26 (or vapor), which is supplied to the combustor 2. The pump 21 supplies water to the cooler 19. The heated reformed fuel 18 heats water and forms steam 26, which is supplied to the combustor 2.

In the first embodiment, methane 13 (original fuel) is reformed with heat extracted from the hot gas 8 discharged from the turbine 3. Methane 13, supplied to the combustor 2, is supplied as high-energy (i.e., high-enthalpy) fuel. The steam reforming reaction of methane can be expressed as follows:

$$CH_4 + H_2O \rightarrow 3H_2 + CO \tag{1}$$

Here, the methane reforming reaction is an endothermic reaction. The heat used for this reaction, i.e., heat from the exhaust gas 8, decreases in accordance with this reaction. As a result, the chemical energy of the fuel after reformation increases. The exhaust heat of the exhaust gas is recovered, based on the above reaction. The reformed fuel is burnt at the combustor 2, as fuel containing hydrogen with chemical energy higher than methane 13 (original fuel). With the above reaction, the efficiency and the power output of the turbine system can be improved.

The compressor 23 is used to raise the reformed fuel to generally about 7–30 ata before it is supplied to the combustor 2. Thus, the fuel 17 can be reformed at the reformer 9 at an atmospheric or other low pressure than that of the combustor. Generally, the temperature of the hot gas 8 exhausted from the turbine 3 is about 550° C. Therefore, if the temperature margin by the heat exchange with the hot gas 8 in the reformer 9 is taken into consideration, the reforming temperature can be raised to about 500° C.

Figure 2:
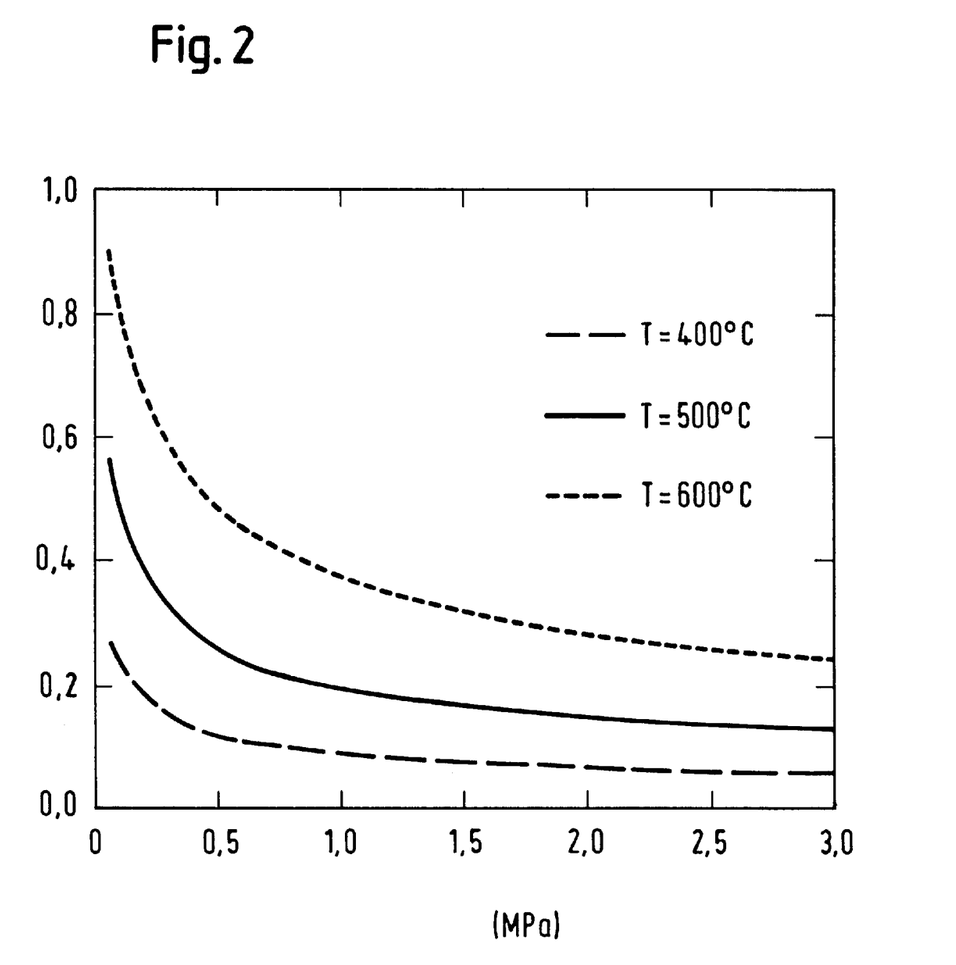
FIG. 2 is a diagram showing a pressure dependence property of the methane reforming ratio.

FIG. 2 shows the relationship between the reforming ratio of methane 13 as original fuel and the pressure under the temperature region of about 500° C., which is the present reforming temperature. The reforming ratio is defined as follows.

When the equilibrium composition of methane at the temperature and the pressure condition given is considered under formula (1), which shows the chemical reaction, the reforming ratio means the ratio of the methane reformed into hydrogen and carbon monoxide and the methane supplied as the original fuel. Therefore, hydrogen converted from methane increases when the reforming ratio increases.

Referring to FIG. 2, as the reforming ratio increases, the pressure required to reform decreases at the temperature range between 400° C. and 600°C. In particular, a decrease in reforming pressure is rather large when the reforming ratio increases. The pressure dependence property of the reforming ratio in the equilibrium composition can be explained as follows. A constant K of the methane reforming reaction of a formula (1) is expressed as:

$$K = f_{CO} f_{H_2}^3 / f_{H_2 + sc} \, {}_0 f_{CH_4} \tag{2}$$

Here, $f_i$ is fugacity and subscript "i" expresses each gas component, when the pressure is low, in terms of a molar fraction $x_i$ and total pressure, can be expressed as:

$$f_i = x_i p \tag{3}$$

Therefore, an equilibrium constant K can be expressed as:

$$K = (X_{CO} X_{H_2}^3 / X_{H_2+sc\ O} X_{CH_4}) p^2 \tag{4}$$

On the other hand, the equilibrium constant K is calculated as follows from the Gibbs free energy change ΔG in the reaction of formula (1), and serves as the function of only the temperature:

$$K = \exp(-\Delta G / RT) \tag{5}$$

R is a gas constant and T is an absolute temperature. According to formulas (4) and (5), the following formula (6) is obtained:

$$K(T)/p^2 = X_{CO} X_{H_2}^3 / X_{H_2+sc\ O} / X_{CH_4} \tag{6}$$

If temperature T is fixed when a pressure is low, $X_{CO} X_{H_2}^3$ increases according to $p^2$, and the methane reforming ratio increases.

This explains that the reforming ratio increases greatly in accordance with the pressure decrease. When the reaction progresses according to formula (1), the number of mols increases from 2 mols to 4 mols (twice), for example. The first embodiment uses the compressor 23 to pressurize the reformed fuel. According to the present invention, the energy needed to compress or pressurize (about 7–30 ata) the reformed fuel 25 supplied to the combustor 2 can be reduced by cooling the reformed fuel 18 before pressurizing. Moreover, in the first embodiment, it is possible to secure from the above pressure dependence properties of the methane reforming ratio at about 500° C., without the need to increase the exhaust-gas temperature, such as using any auxiliary combustion, to 650–800° C., as required in conventional methane reformation. Thus, more exhaust heat from the exhaust gas 8 can be recovered.

In the first embodiment, the temperature of the fuel 17 is raised to about 500° C. during heat exchange with the hot gas 8 to reform the fuel 17. Generally, much compression power is needed to compress the hot gas at such a high temperature. Particularly since the reformed fuel contains much hydrogen, much more compression power is needed in comparison with air. To reduce the power requirement for compressing the reformed fuel, in the first embodiment, the reformed fuel 18 is cooled with the cooler 19 to the temperature (about 80–110° C.), almost a little higher than the dew point of water, before pressurizing the reformed fuel 18. The power required for compressing the reformed fuel in the compressor 23 is decreased, and the efficiency and the output of the turbine system are thus improved.

Furthermore, the efficiency and the output of the turbine system are improved by supplying the steam 26 generated by heat exchange in the cooler 19 to the combustor 2. Moreover, in the first embodiment, it is possible to regulate the reforming ratio of methane 13 as the original fuel by regulating the quantity of steam 15 supplied to the reformer 9, with the valve 42. For example, if the amount of steam supplied to the fuel 13 is set to 0, after methane 13 is heated with the hot gas 8 at the reformer 9, without steam, only methane 13 will be supplied to the combustor 2. In this instance, while the quantity of steam 16 supplied to other utility increases, the amount of fuel heat recovery decreases as no or very little reaction according to formula (1) takes place in the reformer, thus reducing the electric generating power of the turbine system.

Thus, the first embodiment provides a system that supplies heat and electricity, the ratio of which can be made flexible depending on the demand for electric power and steam (heat).

In the first embodiment, methane, which is a component of commonly available natural gas, is identified as an example of an original fuel. According to the present invention, other hydrocarbon fuel, such as ethane, can be used. For example, a reforming reaction of hydrocarbons, such as ethane, which is the other component contained in natural gas, propane, and butane, can be expressed as, respectively:

$$C_2H_6 + 2H_2O \rightarrow 5H_2 + 2CO \tag{7}$$

$$C_3H_8 + 3H_2O \rightarrow 7H_2 + 3CO \tag{8}$$

$$C_4H_{10} + 4H_2O \rightarrow 9H_2 + 4CO \tag{9}$$

The mol numbers more than doubles as a result of the reforming reaction. Therefore, the reforming ratio becomes high so that these hydrocarbons follow reforming reactions similar to methane mentioned above. Furthermore, pressure dependence of the reforming ratio becomes large, as in the case of methane. For this reason, these hydrocarbons and natural gas can be used as original fuel in the first embodiment of the present invention.

In addition, while the first embodiment cools the reformed fuel 18 in the cooler 19 with water 20, other coolants can be used. For example, the reformed fuel 18 may be cooled with highly evaporative liquid, such as methanol. In that case, the highly evaporative liquid, which provides additional hydrogen-rich fuel will be supplied to the combustor 2.

In addition, although the first embodiment is described as introducing air 5 to combust the reformed fuel 25 in the combustor 2, the effect of this invention is similarly ascertained by using other fluids containing oxidant such as for example, fluid containing oxygen and carbon dioxide, fluid containing oxygen and argon, or fluid containing oxygen and helium. Thus, according to the first embodiment, the reforming ratio of original fuel methane can be improved, without performing auxiliary combustion.

Furthermore, the fuel after reformation is cooled by heat exchange before pressurizing the reformed fuel and supplying the pressurized reformed fuel to the combustor. By supplying steam produced through heat exchange to the combustor and reducing the power required for pressurizing the reformed fuel, the efficiency and the output of the turbine system can be improved. Moreover, the embodiment of FIG. 1 provides a system in which heat and electricity can be generated at a flexible ratio depending on the demand.

Figure 9:
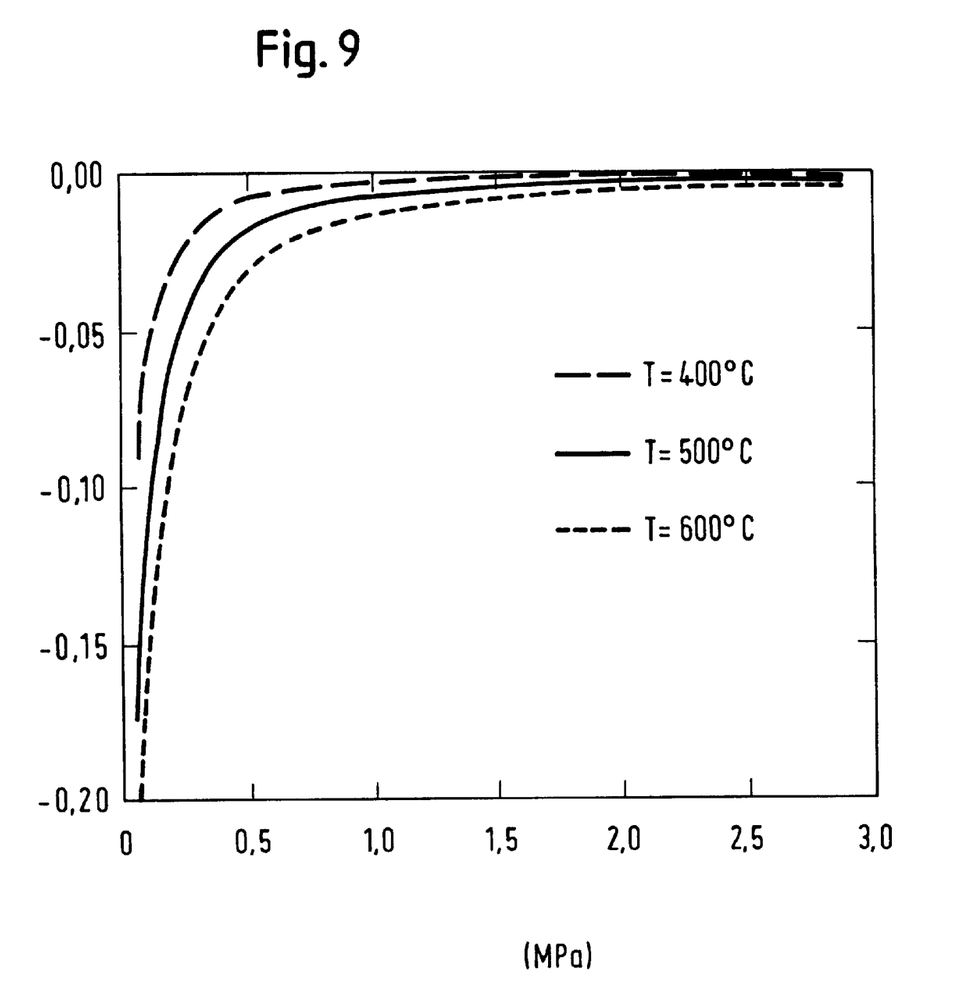
FIG. 9 is a diagram showing the pressure dependence property of the ratio of change of methane reformation.

FIG. 9 shows a diagram of the reforming ratio of change of methane about the turbine system according to the present invention. This diagram is obtained by differentiating the reforming ratio by the pressure in the pressure dependence property of the methane reforming ratio shown in FIG. 2. By this diagram, the degree, i.e., the reforming ratio change, of the pressure change of the methane reforming ratio is ascertained. This diagram also illustrates that, between 400° to 600° C. and beginning from about 7 ata (0.7 MPa), the ratio of change of reformation begins to become substantially constant. That is, the ratio of change of reformation is almost fixed, and there is little change of the reforming ratio by changing pressure. The change of reforming ratio, however, becomes steep below about 7 ata. Thus, the reforming ratio can be increased by lowering the pressure below 7 ata.

For example, in the turbine system of FIG. 1, reformation in the reformer 9 is performed in the pressure of about 7 ata or less. A high reforming ratio can be ascertained at an atmospheric pressure (1 ata or 0.1 MPa). A high reforming ratio can be ascertained as the property of the ratio of change of methane reformation as shown in the pressure dependence property, as shown in FIGS. 2 and 9. Moreover, the pressure of the hot gas 8 from the turbine 3 is about 1 ata or slightly higher. Therefore, any pressure differences between original fuel methane and the hot gas in the reformer can be eliminated by setting the reforming pressure to about 1 ata. Thus, the reformer need not be specially made to withstand high temperature (800° C.), as they only need to operate around 500° C. In this respect, the reformer of various composition, such as a plate type can be used. Moreover, since the reformer can be made simple, the cost of the turbine system can be lowered. The other embodiment disclosed below can also use the preferred reforming pressure of about 1 ata.

Figure 3:
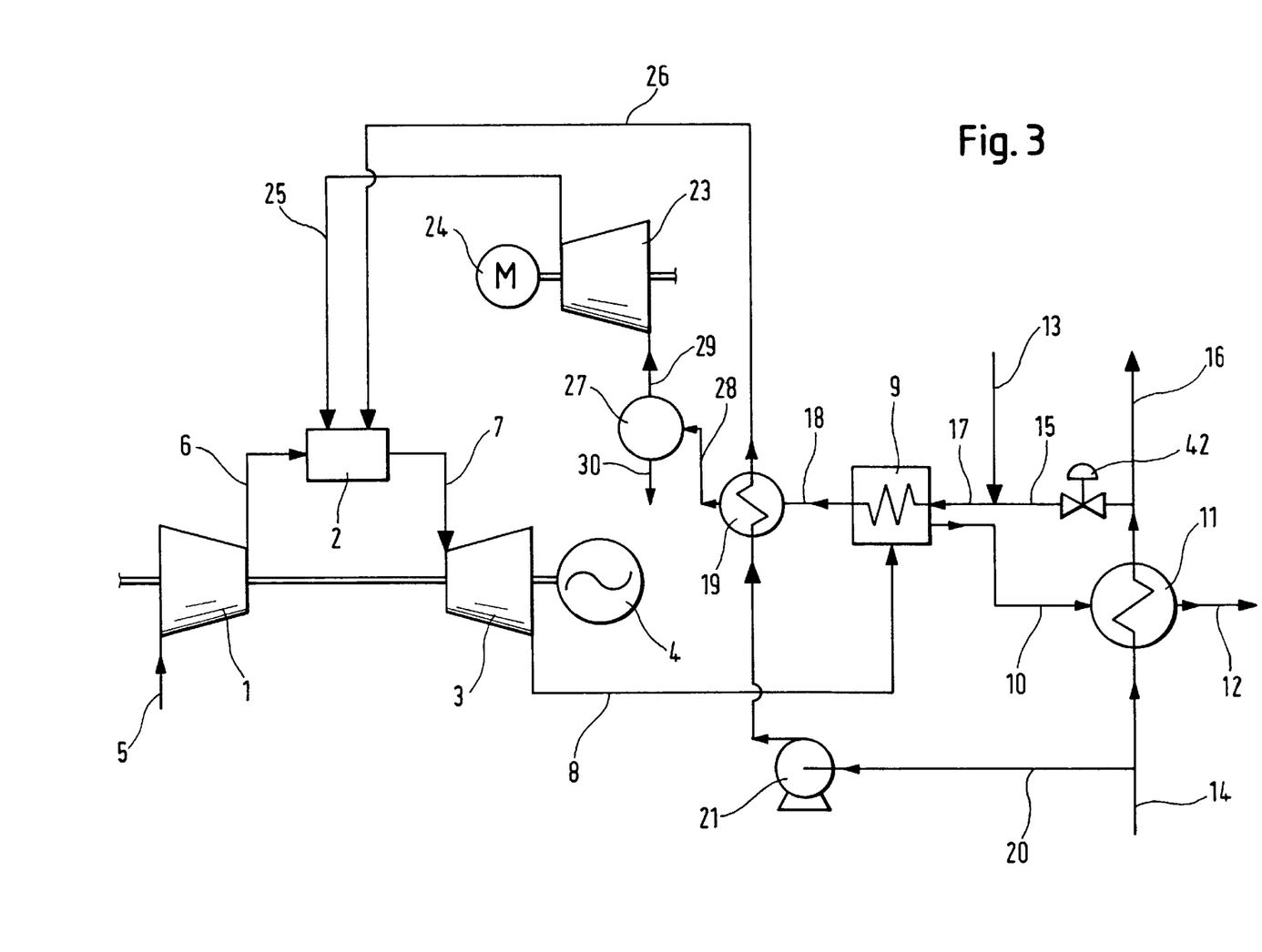
FIG. 3 shows a schematic diagram of a turbine system of a second embodiment according to the present invention.

FIG. 3 shows a schematic diagram of a turbine system of the second embodiment according to the present invention. The second embodiment is substantially similar to the first embodiment, except that the second embodiment includes an additional condenser 27 that condenses the steam in the reformed fuel 18 to water before it is compressed. That is, the reformed fuel 18 (reformed at the reformer 9) is first cooled at the cooler 19. The condenser 27 condenses the steam contained in the cooled reformed fuel 28 to water. The condensed steam, i.e., water 30, is extracted from the reformed fuel before it is supplied to the combustor 2. The condensed reformed fuel 29 is then compressed with the compressor 23.

In methane/steam reformation, the mol ratio of steam to methane is about 1.5, i.e., 1.5 mol of steam to 1 mol of methane. Thus, excess steam not used during reforming of methane remains in the reformed fuel 18. By separating and removing excess steam contained in the reformed fuel (before pressurization), the flow rate of the fuel pressurized at the compressor 23 and the power needed to pressurize the reformed fuel 29 can be reduced.

Figure 4:
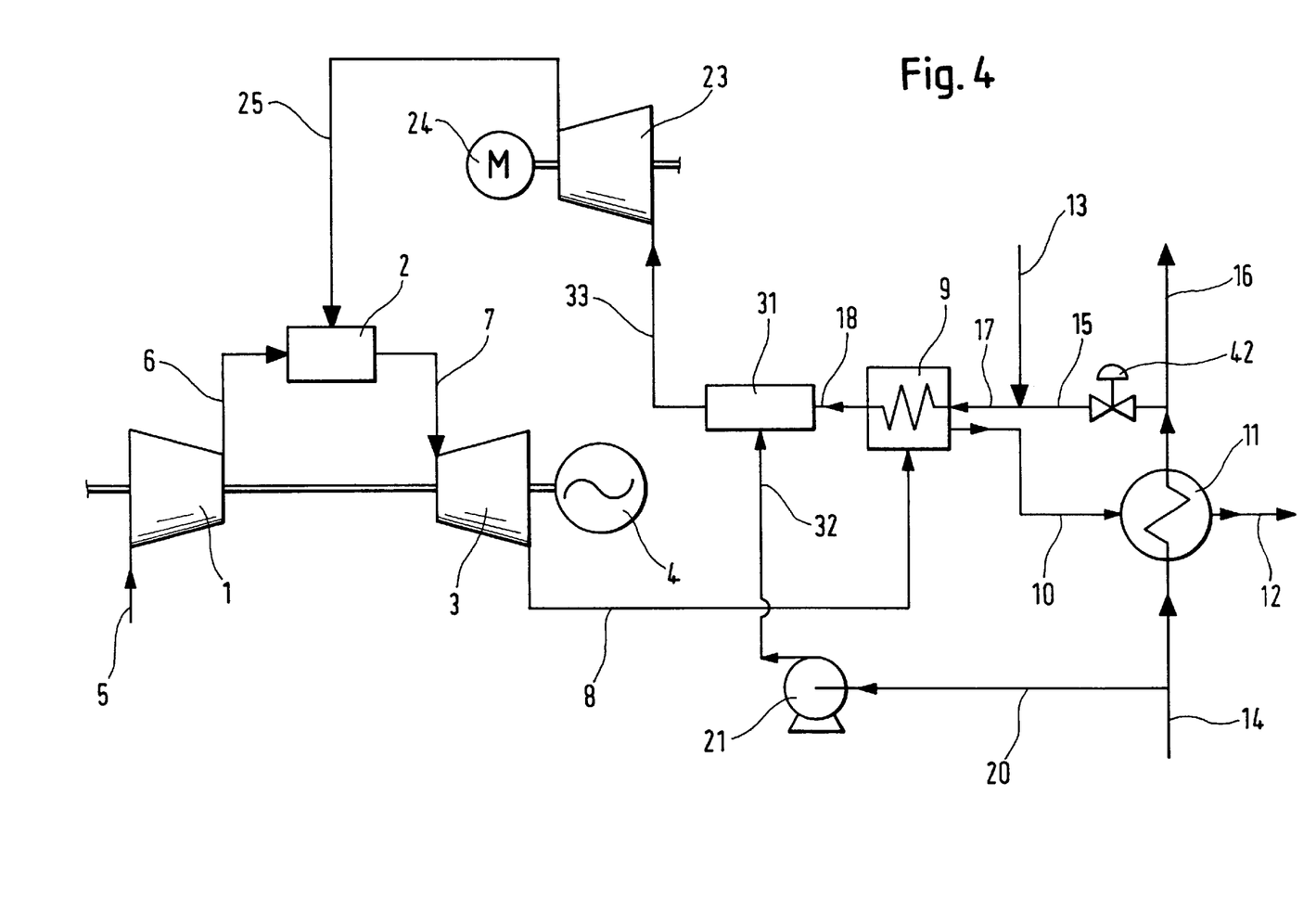
FIG. 4 shows a schematic diagram of a turbine system of a third embodiment according to the present invention.

FIG. 4 shows a schematic diagram of a turbine system of the third embodiment according to the present invention. The third embodiment is substantially similar to the first embodiment, except that in the third embodiment, the reformed fuel 18 is cooled by injecting water 32 into a cooler 31, as opposed to circulating water through the cooler, and mixing with the reformed fuel 18. The pump 21 supplies water 20 pressurized to the pressure required for injection. The reformed fuel 18, which is at near the reforming temperature of about 500° C., is cooled to about 80–100° C., which is slightly higher than the dew point of water. The hot reformed fuel heats water 32, forming steam. Thus, the reformed fuel 33 consists essentially of steam and the reformed fuel 18. The compressor 23 compresses the reformed fuel 33. Because the cooled reformed fuel 33 is at a substantially lower temperature, the power required to pressurize the same is reduced. The water 32 used for cooling the reformed fuel 18 is supplied to the combustor 2 as steam, mixed with the reformed fuel 18.

In addition, in the third embodiment, although the reformed fuel 18 is cooled by injecting water 32, liquid having evaporative characteristic, such as methanol, for example, can be used instead of water 32. In that case, the chemical energy of the fuel supplied to the combustor 23 will become higher. Thus, like the first and second embodiments, power required for compressing the reformed fuel is reduced in the third embodiment. Furthermore, the efficiency and the output of the turbine system can be improved by supplying steam generated from the water used for cooling the reformed fuel 18 to the combustor 2.

Figure 5:
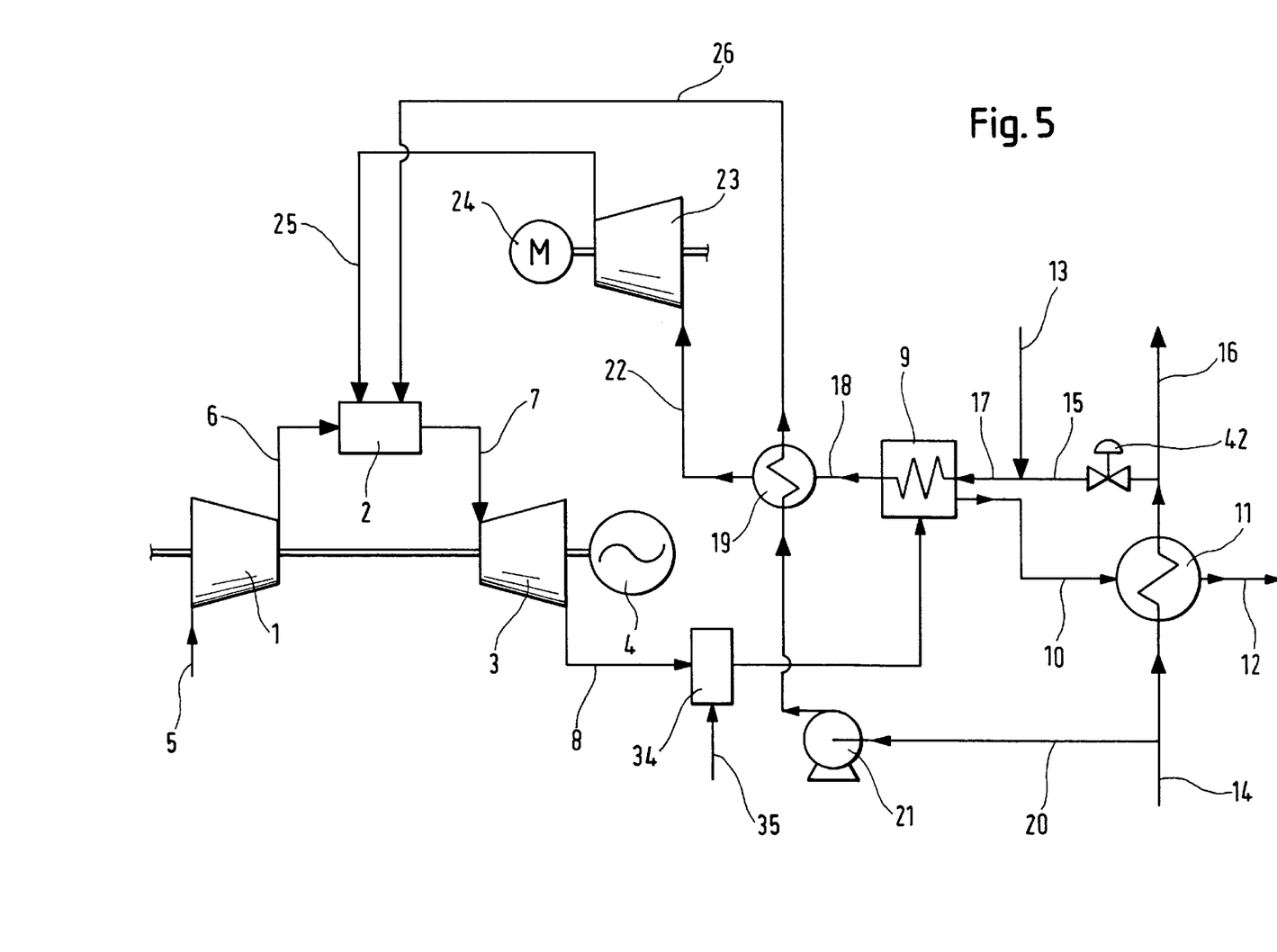
FIG. 5 shows a schematic diagram of a turbine system of a fourth embodiment according to the present invention.

FIG. 5 shows a schematic diagram of a turbine system of the fourth embodiment according to this invention. The fourth embodiment is substantially similar to the first embodiment, except that the fourth embodiment includes a combustor 34 that burns additional fuel 35 by using oxygen contained in the hot gas 8 discharged from the turbine 3 to raise the reforming temperature in a reformer 9. As in the other embodiments of the present invention, reformation in the reformer 9 is performed at a pressure that is substantially lower than the supply pressure to the combustor 2. Therefore, the reforming ratio is further improved by increasing the reforming temperature (by combustion in the combustor 34). If the reforming pressure is kept low, the reforming ratio, as shown in FIG. 2, is increased significantly, even if only a slight temperature increase. For example, under the conventional system, the reforming temperature needs to rise to about 800° C. at pressures 7–13.8 ata.

According to the fourth embodiment of the present invention, the reforming temperature needs to rise only to about 600° C. to obtain a sufficiently large reforming ratio because of the reduced pressure. This means that the amount of additional fuel 35 supplied to the combustor 34 is far less, compared with an auxiliary combustion of the conventional system. For this reason, even if the additional fuel 35 is taken into account, the efficiency and the output of the turbine system are improved by the improved reforming ratio. Moreover, like the first, second, and third embodiments, in the fourth embodiment, the generating ratio of power (electric power) and a steam (heat) can be regulated according to use by regulating the reforming ratio of methane 13 ( original fuel) and the rate of heat recovery from the hot gas 8 by regulating the quantity of the steam 15 supplied to the reformer 9 with the valve 42. Thus, according to the fourth embodiment, since the reforming ratio of original fuel methane can be raised, the rate of heat recovery from the hot gas and the efficiency and the output of the turbine system can be improved, while supplying heat and electricity at a flexible ratio depending on the demand.

Figure 6:
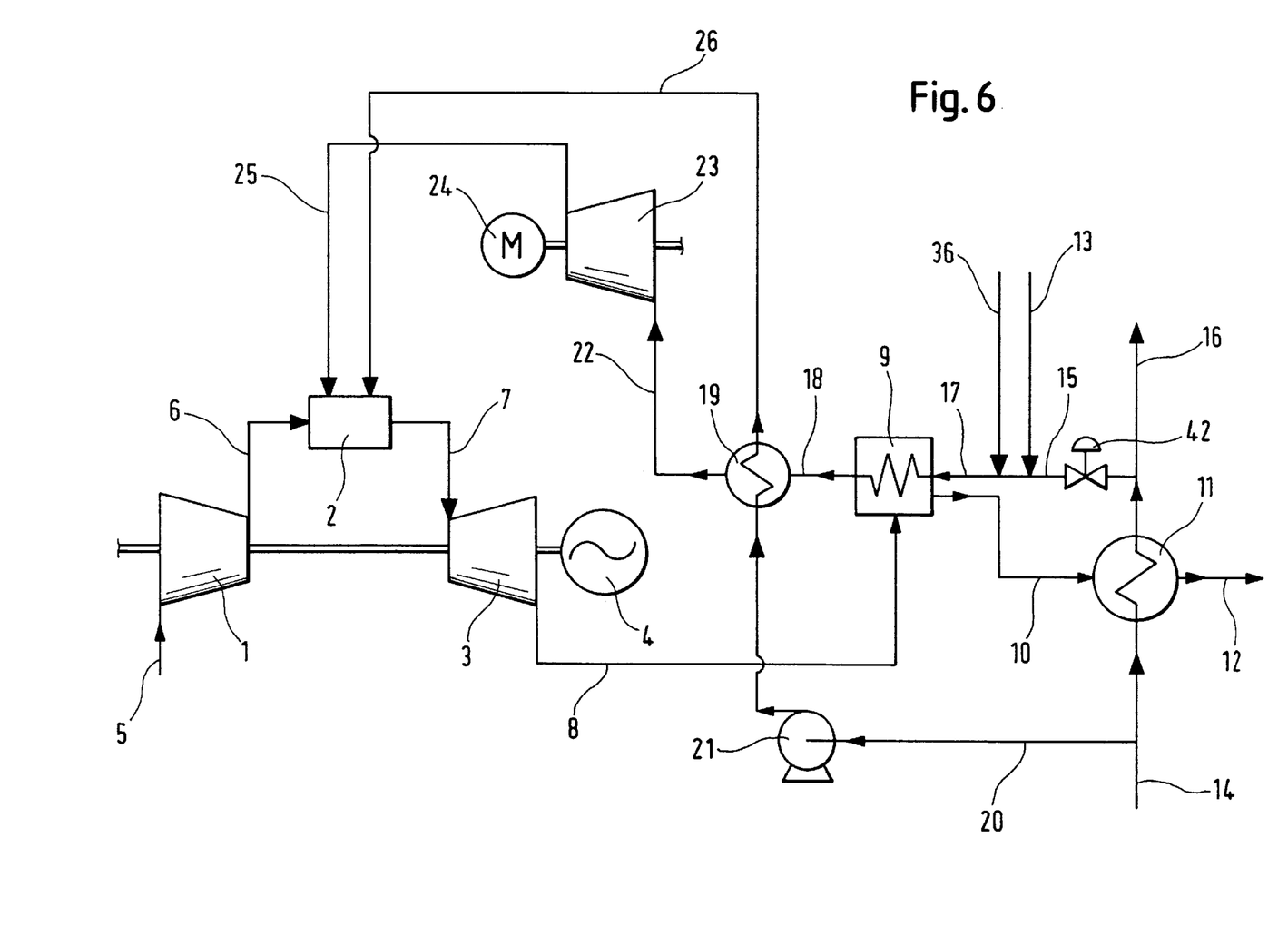
FIG. 6 shows a schematic diagram of a turbine system of a fifth embodiment according to the present invention.

FIG. 6 shows a schematic diagram of a turbine system of the fifth embodiment according to the present invention. The fifth embodiment is substantially similar to the first embodiment, except that the fifth embodiment injects an oxidant 36 containing oxygen in combination with methane 13 as original fuel. The oxidant 36 can be contained in the methane, i.e., premixed with methane. For example, the fuel 17 before reforming can comprise oxidant 36 (such as air), methane 13, and steam 15. The reformer 9 reforms the fuel 17. The reforming temperature is raised when part of methane 13 burns at the reformer 9.

In the fifth embodiment, like the other embodiments of the present invention, reformation in the reformer 9 occurs at a pressure that is far lower than the supply pressure to the combustor 2. Furthermore, the reforming ratio is improved by the increased reforming temperature by partial combustion of methane 13 in the reformer 9 and the lower reforming pressure, as explained before. Even if the combustion of original fuel methane 13 is taken into account, the efficiency and the output of the turbine system improve because the reforming ratio is improved.

Figure 7:
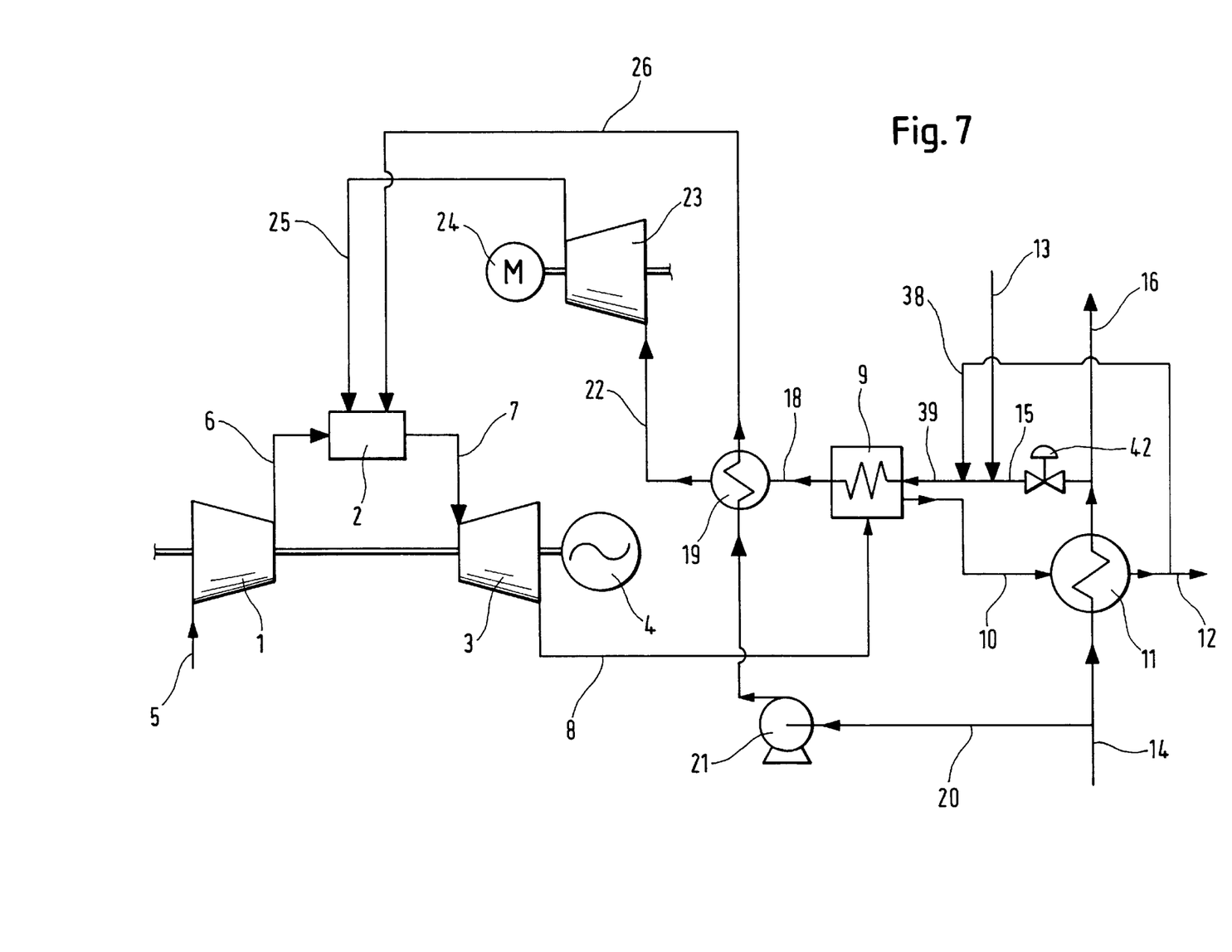
FIG. 7 shows a schematic diagram of a turbine system of a sixth embodiment according to the present invention.

FIG. 7 shows a schematic diagram of a turbine system of the sixth embodiment according to the present invention. The sixth embodiment is substantially similar to the fifth embodiment, except that in the sixth embodiment, the oxidant 38 is obtained from the hot gas 12 exhausting through the evaporator 11. The hot gas 12 contains sufficient oxygen to burn part of methane 13. The fuel 17 in the sixth embodiment consists essentially of methane 13, steam 15, and exhaust gas 38. Like the fifth embodiment, the reforming temperature is raised when part of methane 13 burns at the reformer 9. Like the other embodiments of the present invention, reformation in the reformer 9 is performed at a pressure that is far lower than the supply pressure to a combustor 2, and the reforming ratio is increased by raising the reforming temperature by partial combustion of methane 13 in the reformer 9. In addition, the hot gas 8 discharged from the turbine and the reformer also can supply oxidant.

Figure 8:
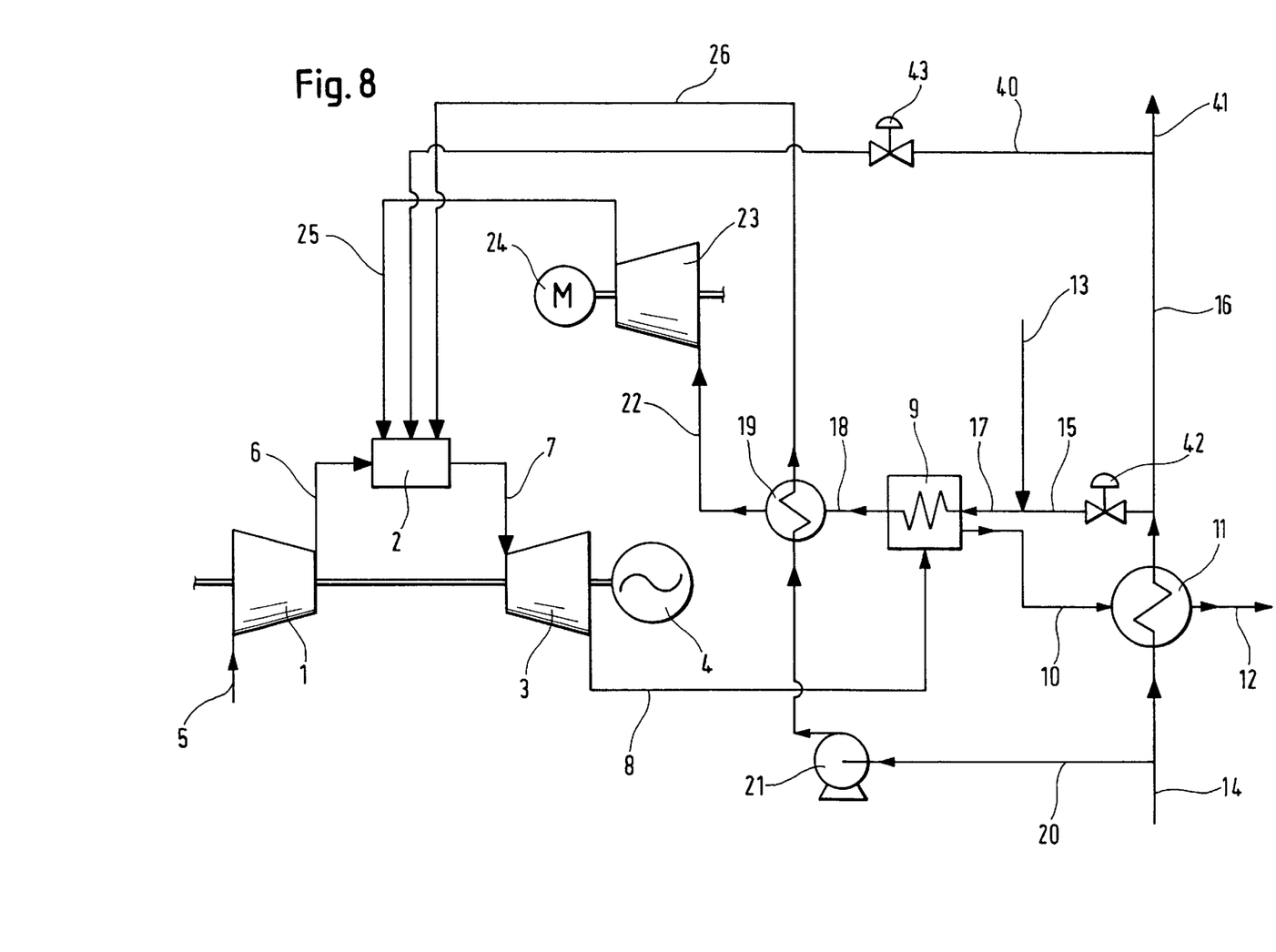
FIG. 8 shows a schematic diagram of a turbine system of a seventh embodiment according to the present invention.

FIG. 8 shows a schematic diagram of a turbine system of the seventh embodiment according to the present invention. The seventh embodiment is substantially similar to the first embodiment, except that in the seventh embodiment, additional steam 40, which is routed from steam 16 for utilities, can be supplied to the combustor 2 via a valve 43. The remaining steam 41 after extraction can be used for other utilities.

Furthermore, in the seventh embodiment, by increasing the opening degree of the valve 43 to increase the quantity of steam 40 input to the combustor 2, the generating power of a turbine 3 can be increased while the quantity of the steam 41 for utilities can be decreased. Conversely, the generating power of a turbine 3 can be decreased by reducing the quantity of steam 40 input to the combustor 2, while increasing the quantity of the steam 41 for utilities.

According to the present invention, the reforming ratio is increased by decreasing the pressure at which the fuel undergoes reformation. Although the reformer 9 preferably reforms the fuel at about 1 ata, reforming can occur under a higher pressure, at 7 ata or less. When the pressure at which the fuel undergoes reformation is this low, the temperature at which the fuel undergoes reformation need not be as high, e.g., 650–800° C., as conventional systems to provide a relatively large reforming ratio. Instead, similar or better results can be obtained at about 500–600° C. according to the present invention. The lower reforming temperature increases the efficiency since more heat can be recovered.

Moreover, power required for compressing the reformed fuel is reduced by lowering the reformed fuel temperature. The efficiency and the output of the turbine system can be improved by cooling the reformed fuel with water, and applying steam thus generated from the water used for cooling the reformed fuel to the combustor.

Moreover, the generating ratio of power (electric power) and a steam (heat) can be regulated according to the present invention by regulating the reforming ratio and the heat recovery from the hot gas 8, by regulating the quantity of steam supplied to the reformer with the valve 42. Since the reforming ratio can be raised without raising the reforming temperature to 800° C., more heat can be recovered to improve the efficiency and the output of the turbine system. The present turbine system thus can supply both heat and electricity, as desired, depending on the need.

Although methane from natural gas is chiefly explained to this embodiment as original fuel, other hydrocarbon containing fuel, such as ethane, propane, and butane, can be used with the turbine system according to the present invention and to achieve similar benefits mentioned above. Moreover, the coolant can be a highly evaporative liquid, such as methanol, which can be supplied to the combustor. In addition, although air is chiefly described as oxidant for combustion of the reformed fuel 25 in the combustor 2, other oxidant containing fluid can be used instead of air, such as fluid containing oxygen and carbon dioxide, fluid containing oxygen and argon, and fluid containing oxygen and helium.

The present invention may be embodied in other specific forms without departing from the spirit or essential attributes therefore and, accordingly, reference should be made to the appended claims, rather than to the forgoing specification, as indicating the scope of the invention.

Japanese priority Application No. P 10-251475, filed on Sep. 4, 1998, including the specification, drawings, claims and abstract, is hereby incorporated by reference.

What is claimed is:

1. A turbine system for producing power, comprising:
a reformer that reforms fuel containing a mixture of hydrocarbon gas and steam to produce hydrogen and carbon dioxide;
an oxidant compressor that compresses oxidant;
a fuel compressor that compresses the fuel reformed by the reformer;
a combustor that burns the oxidant received from the oxidant compressor and the reformed fuel received from the fuel compressor to generate hot gas; and
a turbine that receives the hot gas from the combustor and generates power, the reformer receiving the hot gas discharged from the turbine as a heat source to heat and reform the fuel.

2. A turbine system according to claim 1, wherein the reformer reforms the fuel under pressure less than or equal to 7 ata.

3. A turbine system according to claim 1, further including a cooler that cools the reformed fuel with a coolant before the reformed fuel is compressed with the fuel compressor.

4. A turbine system according to claim 3, further including a condenser that extracts water contained in the cooled reformed fuel before compressing the cooled reformed fuel with the fuel compressor.

5. A turbine system according to claim 1, further including a condenser that extracts water contained in the reformed fuel before compressing the reformed fuel with the fuel compressor.

6. A turbine system according to claim 3, wherein the coolant is water and the reformed fuel heats water and generates steam, the heat exchange between water and the reformed fuel cooling the reformed fuel.

7. A turbine system according to claim 6, wherein the steam is introduced directly into the combustor.

8. A turbine system according to claim 3, wherein the coolant is a liquid that evaporates, the coolant being evaporated by heat exchange between the reformed fuel, and wherein the evaporated coolant is introduced directly into the combustor.

9. A turbine system according to claim 1, further including an evaporator that generates steam by evaporating water using the hot gas exhausted from the reformer as a heat source.

10. A turbine system according to claim 9, wherein the steam produced by the evaporator is introduced directly into the combustor.

11. A turbine system according to claim 9, wherein the steam produced by the evaporator is mixed with the hydrocarbon containing gas before the fuel is introduced into the reformer.

12. A turbine system according to claim 11, further including a power generation regulator that regulates the amount of power generation by regulating the amount of steam mixed with the hydrocarbon containing gas.

13. A turbine system according to claim 1, further including means for raising the reforming temperature.

14. A turbine system according to claim 13, wherein the reforming temperature raising means comprises an additional combustor that combusts the hot gas exhausted from the turbine and the additional fuel to raise the temperature of the hot gas introduced to the reformer.

15. A turbine system according to claim 13, wherein the reforming temperature raising means comprises an oxidant mixed with the pre-reformed fuel, the oxidant causing the pre-reformed fuel to partly combust when the exhaust gas discharged from the turbine heats the pre-reformed fuel in the reformer, thus raising the reforming temperature.

16. A turbine system according to claim 19, further including an evaporator that produces steam by evaporating water using the exhaust gas exhausted from the reformer as a heat source, wherein the oxidant is the exhaust gas discharged from one of the turbine, the evaporator, and the reformer.

17. A method of producing power, comprising:
reforming a fuel containing a mixture of hydrocarbon gas and steam in a reformer by heating with a heat source to produce hydrogen and carbon dioxide;
compressing the reformed fuel;
compressing oxidant;
generating hot gas by combusting the compressed reformed fuel and the compressed oxidant in a combustor;
discharging the hot gas to a turbine; and
generating power from the turbine,
wherein the heat source is the hot gas discharged from the turbine.

18. A method according to claim 17, wherein the fuel is reformed under pressure less than or equal to 7 ata.

19. A method according to claim 17, further comprising cooling the reformed fuel with a coolant before the reformed fuel is compressed.

20. A method according to claim 17, further comprising condensing the water contained in the reformed fuel before compressing the reformed fuel.

21. A method according to claim 17, further comprising forming steam by evaporating water using the hot gas discharged from one of the turbine and the reformer, and introducing the steam directly into the combustor.

22. A method according to claim 17, further comprising forming steam by evaporating water using the hot gas discharged from one of the turbine and the reformer, and mixing the steam with the hydrocarbon containing gas before the fuel is introduced into the reformer.

23. A method according to claim 22, further comprising regulating the amount of power generation by regulating the amount of steam mixed with the hydrocarbon containing gas.

24. A method according to claim 17, further comprising raising the reforming temperature by combusting the hot gas discharged from the turbine and additional fuel to raise the temperature of the hot gas before it is introduced into the reformer.

25. A method according to claim 17, further comprising raising the reforming temperature by mixing an oxidant with the pre-reformed fuel, the oxidant causing the pre-reformed fuel to partly combust when the hot gas discharged from the turbine heats the pre-reformed fuel in the reformer, thus raising the reforming temperature.

* * * * *